March 20, 1962  K. CANFOR ETAL  3,026,471
INDUCTIVE DEVICES

Filed Aug. 17, 1959

3 Sheets-Sheet 1

WITNESSES

INVENTORS
Kenneth Canfor, Fricis A. Goba
Gerald L. Tiley & Eric Oldfield
BY
ATTORNEY March 20, 1962 K. CANFOR ETAL 3,026,471
INDUCTIVE DEVICES Filed Aug. 17, 1959 3 Sheets-Sheet 3

United States Patent Office 3,026,471
Patented Mar. 20, 1962

3,026,471
INDUCTIVE DEVICES
Kenneth Canfor, Dundas, Ontario, Fricis A. Goba, Hamilton, Ontario, and Gerald L. Tiley and Eric Oldfield, Burlington, Ontario, Canada, assignors to Canadian Westinghouse Company, Limited, Hamilton, Ontario, Canada
Filed Aug. 17, 1959, Ser. No. 834,331
Claims priority, application Canada Sept. 27, 1958
4 Claims. (Cl. 323—89)

The present invention is concerned with circuit control devices in general, and improvements in or relating to inductive or magnetic circuit control devices in particular.

Many industrial control systems employ mechanical switches, for example push buttons, that are manually actuated by an operator to give a required electric signal.

It is an object of the present invention to provide an improved inductive device that can provide a desired electric signal, without the use of mechanically engaging and disengaging contacts.

It is a different object to provide an improved circuit controlling device better operative to effectively open and close an electrical circuit relative to energy received from a power supply and intended for use by a provided load circuit.

According to the present invention there is provided an inductive device comprising a closed core of magnetic material, coils disposed on opposite limbs of the core and connected in series with one another, a pair of sources connected in series with one another and connected respectively to the said coils to supply operating current thereto, means for positioning in relation to the said core a magnet for increasing the flux in one coil bearing core limb relative to that in the other limb, and output terminals comprising the junction of the two sources and the junction of the two coils.

Figure 1:
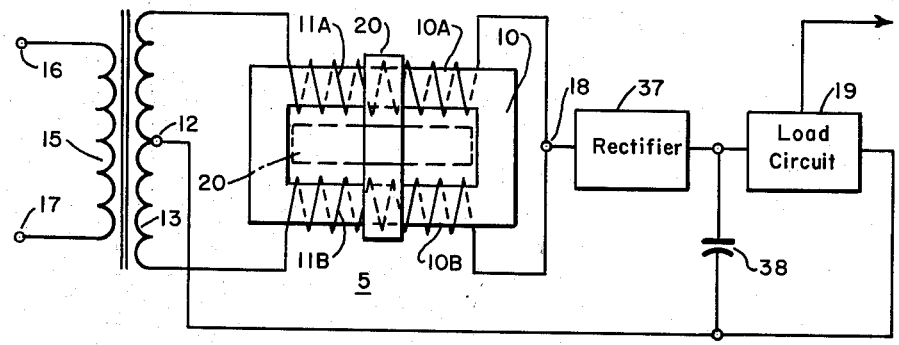
Figure 2:
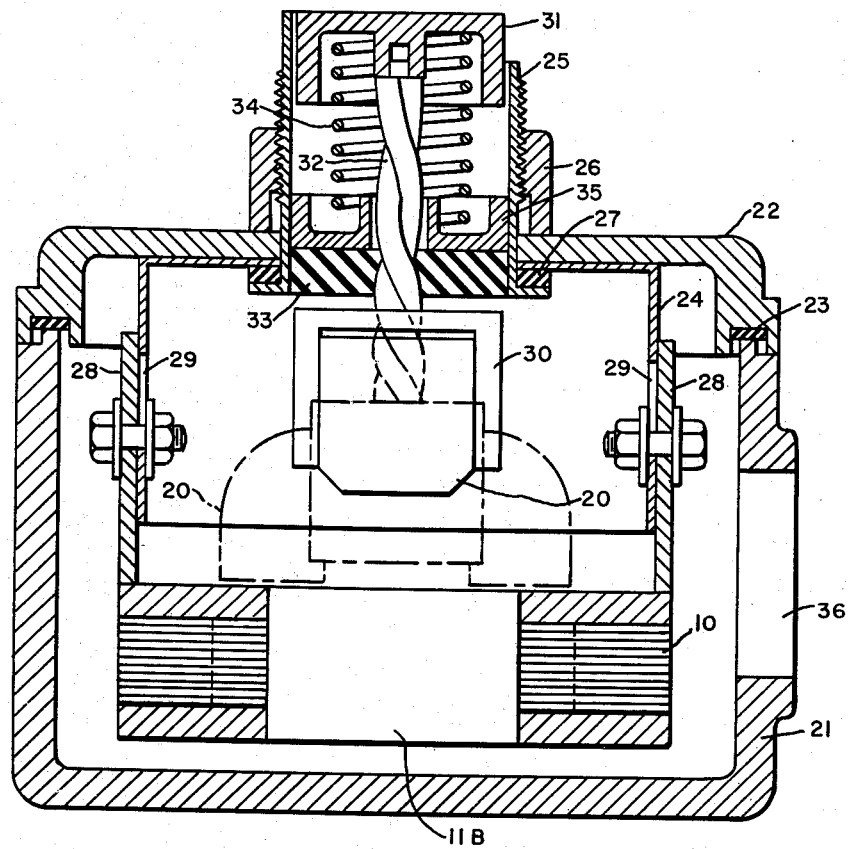
Figure 5:
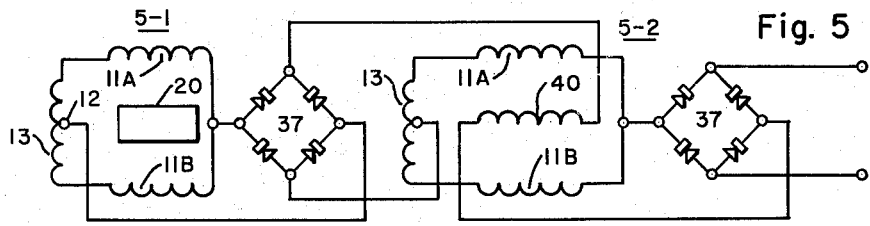
Figures 3, 6:
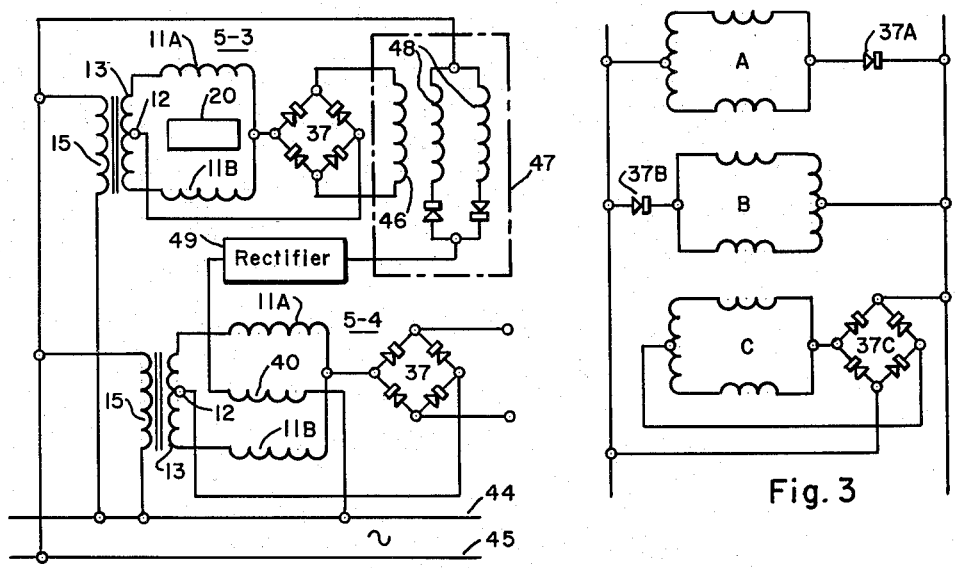
Figure 4B:
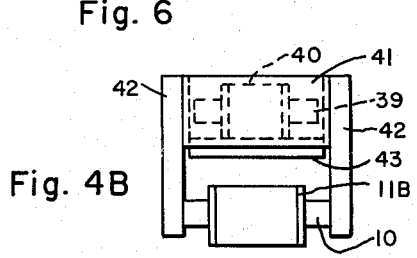
Figure 4A:
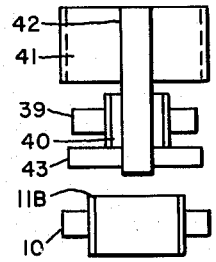
Figure 8:
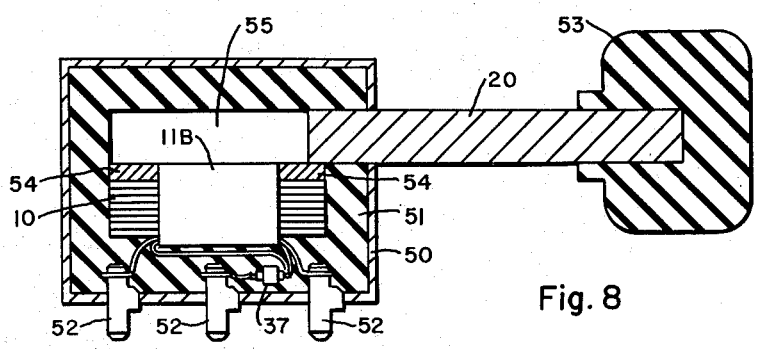
Figure 7:
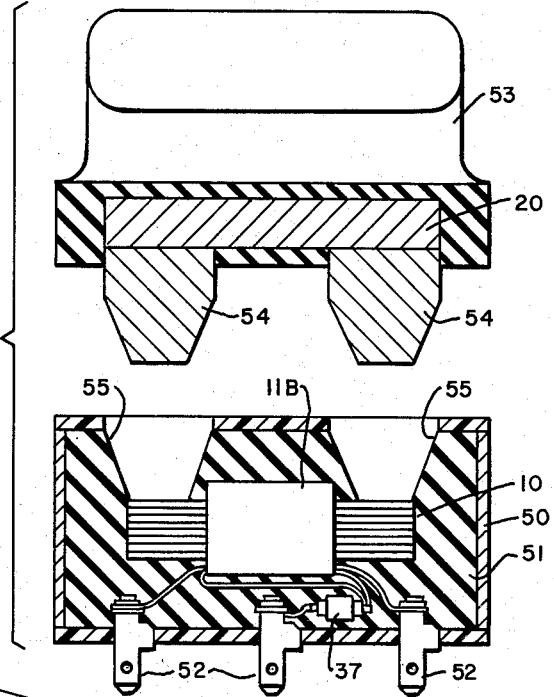
Figure 10:
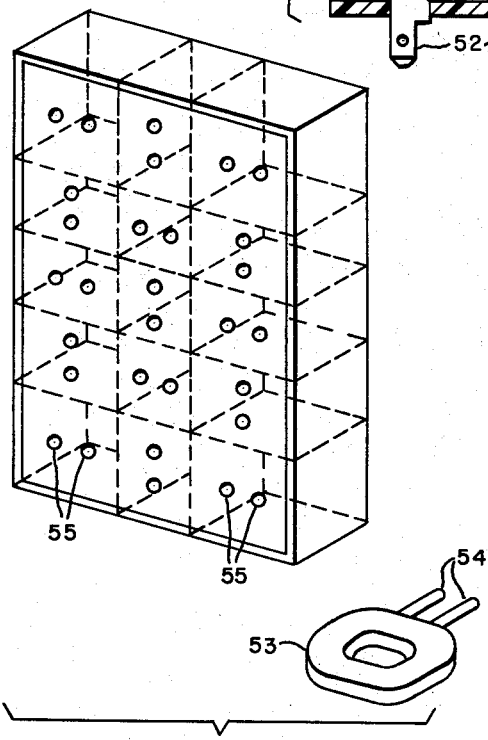
Figure 9:
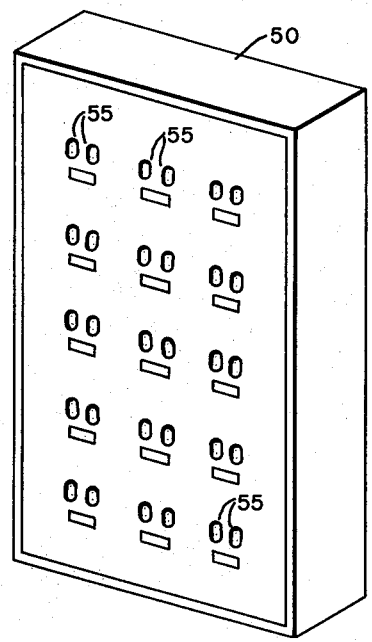

Specific embodiments of the invention will now be described, by way of example, with reference to the accompanying diagrammatic drawings wherein:

FIGURE 1 is a circuit diagram of a device employing a permanent magnet operating member, FIGURE 2 is a sectional view of a device as illustrated by FIGURE 1 and wherein the permanent magnet operating member is enclosed within a casing for the device, FIGURE 3 is a circuit diagram showing an arrangement of a number of devices in parallel, FIGURES 4A and 4B show the general construction of a device employing an electromagnet operating member, FIGURES 5 and 6 are circuit diagrams showing different ways of providing for series operation of two devices, FIGURES 7 and 8 are part sectional views of devices wherein a permanent magnet operating member is separate from the device, and FIGURES 9 and 10 show different arrangements of a number of devices in a single casing.

In all the figures of the drawings like parts are given the same reference numeral.

Referring first to FIGURE 1, there is shown a control device 5 including a closed core 10 of a ferromagnetic material that will saturate at a predetermined flux value. Two similar coils 11A and 11B are wound on respective opposite similar limbs 10A and 10B of the core, the coils being connected in series with one another and with the center 12 of a secondary winding 13 of a transformer 14. A primary winding 15 of the transformer is supplied with power from a supply represented by terminals 16 and 17. It will be appreciated that the tapped transformer may be replaced by an autotransformer or tapped choke.

The alternating flux in the core resulting from the current flowing in the coils 11A and 11B is just below the value required to saturate the core limbs 10A and 10B, and under these conditions the resulting potential difference between the center tap 12 and a connection point 18 between the two coils is zero. In effect, a balanced bridge is provided by the two coils 11A and 11B, which are of equal impedance and constitute two arms of the bridge, and the two halves of the winding 13, which are also of equal impedance and constitute the two other arms of the bridge. With the bridge balanced and the potential difference zero no current will flow through a circuit load 19 to be controlled by the device 5, and the device is effectively in open circuit condition. In practice it may not be possible to reduce the open circuit condition current completely to zero, but the necessary effect will be achieved if the load circuit 19 is sufficiently insensitive to the open condition current.

If now a magnet 20 is placed as indicated in FIGURE 1 by broken lines, with its magnetic axis parallel to the major axes of the coils 11A and 11B, then the flux in each of the limbs 10A and 10B will be the sum of the alternating flux from the coils and the flux from the magnet. The magnet flux is arranged to be sufficient to saturate one of the limbs, so that the impedances of the two coils will differ substantially and the bridge is now unbalanced, giving a resultant potential difference between the tap 12 and the connection point 18. This resultant potential difference causes a flow of current in the load circuit 19, so that the presence of the magnet 20 in the position shown in broken lines brings the control device 5 effectively to a closed circuit condition. The maximum current flow that can be obtained in the load circuit 19 is dependent on the parameters of the load circuit 19, the control device 5 and its associated magnet 20. The resultant potential difference is predominantly the second harmonic of the supply frequency and one practical effect of this face is that the output which is obtained from the load circuit device 19 is independent of the direction of the north-south magnetic axis of the magnet 20.

In practice the magnet 20 is of high flux density and accordingly, if its magnetic axis remains parallel to the coil major axes, then it must be moved to a relatively large distance from the control device 5 for the latter to be brought to a satisfactory open condition. This distance can be reduced substantially to a practical value by arranging that the magnet is not only moved but also is rotated to the position shown by solid lines in FIGURE 1, in which its magnetic axis is perpendicular to the major axes of the coils 11A and 11B. In this last-mentioned position the resultant flux in each core limb 10A and 10B produced by the magnet 20 is substantially zero and the impedances of the coils will remain approximately equal.

One specific construction for a single pushbutton control device is shown in FIGURE 2. A casing consists of a body part 21 and a cover 22 held together by suitable fasteners such as screws (not shown) with a dust and moisture excluding gasket 23 between them. A cylindrical support 24 is clamped to the inside of the cover 22 by a tubular bolt 25 and a cooperating nut 26, a gasket 27 being provided. A frame 28 carrying the core 10 and the coils with coil 11B being shown is fastened to the support 25 by two bolts, which work in slots 29 to permit relative adjustment between the frame 28 and the support 25. The magnet 20 is held in a yoke 30 that is connected to the pushbutton 31 by a square-section, helically-twisted rod 32, the rod working in a nut 33 carried by the tubular bolt 25. Normally, the magnet is held in the position shown in solid lines by a compression spring 34 engaged between the underside of the pushbutton 31 and a cup washer 35 abutting the nut 33; with the magnet in this position the pushbutton switch is in the open condition, as described above.

When the pushbutton 31 is depressed by the operator the magnet 20 is moved toward the core 10, and at the same time it is rotated by the action of the helically-twisted rod 32 and the nut 33, until it is in the position shown in broken lines, in FIGURE 1 whereupon the control device 5 is in its fully closed condition, again as described above. Electrical leads to and from the device are passed through an aperture 36 in the side wall of the body 21. With such a device there are no mechanically engaging and disengaging contacts to be maintained and, moreover, the device is inherently explosion proof without the need for the heavy and bulky case normally employed with switches intended for such service.

It will be apparent that various methods may be used for the manufacture of this pushbutton control device. For example, the nut 33 may be cast from a resin about the rod 32, so that the two will mate accurately together. In other constructions the yoke 30 and the rod 32 may be cast together from a synthetic material such as nylon. In view of the absence of surfaces requiring maintenance the whole unit, or parts thereof such as the core, the windings and the magnet, may be encapsulated in a moisture-impervious casing of a resin.

In this embodiment the displacement of the magnet and its yoke is the same as the displacement of the pushbutton, but in other embodiments the connection may provide a mechanical advantage so that the pushbutton displacement is less than the magnet displacement.

The load circuit 19 may comprise a phase sensitive static magnetic logic element capable of operating with a supply current frequency of twice the supply frequency to the device, and in that case a rectifier 37 is provided to give signals of the required phase, the output being smoothed by a capacitor 38. The use of such phase-sensitive elements has the special advantage that three pushbutton devices can be connected to the same pair of wires and will give three distinctive signals. For example, in the system illustrated by FIGURE 3 the pushbutton A has half-wave rectifier 37A connected in one direction, while a similar pushbutton B has half-wave rectifier 37B connected in the opposite direction; the third signal is obtained with pushbutton C by providing a full wave rectifier 37C. For a number of pushbuttons giving $n$ distinctive signals the number of wires ($w$) required is given by the expression $$w = \frac{n}{3} + 1$$

In the embodiments described so far a permanent magnet has been employed to provide the additional flux to the core 10, but an electromagnet can also be used, and an example of the general arrangement of such a device is illustrated in FIGURES 4A and 4B, the figures showing the control device in open and closed circuit condition respectively. The core 10 and coils 11A, 11B are the same as or similar to those in the device in FIGURE 2, the electromagnet consisting of a core 39 and a coil 40. A non-magnetic cylinder 41 movable by the operator between the positions shown respectively in FIGURES 4A and 4B carries two pole pieces 42 which, when in the position shown in FIGURE 4B, apply the flux from the electromagnet to the core 10. A keeper bar 43 is provided to prevent the residual magnetism of the electromagnet affecting the core 10 while the device is in open circuit condition (FIG. 4A).

The use of an electromagnet enables two or more devices to be connected effectively in series, whereas devices with permanent magnets can only be operated in parallel. Different methods of obtaining such series operation are illustrated by FIGURES 5 and 6 respectively. In the circuit of FIGURE 5 a first control device 5–1 provided with a permanent magnet 20 is connected to feed the output of its rectifier 37–1 to the electromagnet coil 40 of the second control device 5–2, so that actuation of the second device 5–2 will not result in a signal from that second control device unless the first control device has been actuated.

In the circuit of FIGURE 6 a first control device 5–3 employing a permanent magnet 20 is provided with operating current from supply lines 44 and 45, the output of its rectifier 37 being fed to a control winding 46 of a magnetic amplifier 47. A second control device 5–4 has an electromagnet winding 40 that is supplied with operating current from output windings 48 when the first control device 5–3 is in closed circuit condition. It may be found that feeding the amplifier output directly to the winding 40 causes difficulty owing to the phase difference between the currents in the coils 11A, 11B and 40, and in that case a rectifier 49 may be provided. In other embodiments (not illustrated) the output from the amplifier 47 may be fed to the primary winding 15, the electromagnet winding 40 being supplied directly from the supply lines 44 and 45. It will be apparent that with any of the circuits described with reference to FIGURES 5 and 6 more than one second control device 5–4 can be controlled by a single first control device 5–3, and each second control device 5–4 may be controlled by more than one first control device 5–3, if desired.

A control device having no moving parts within the casing enclosing the coils may be provided by employing a permanent magnet or an electromagnet that is separate from the remainder of the control device, e.g. in the form of a magnetic control member that is carried by the operator. Such a control device avoids the danger that contamination (e.g. dirt) or corrosion of the return mechanism may cause the control device to jam. Moreover, it is possible to prevent unauthorized operation of the control device since only authorized operators will have the necessary control member.

In the control device illustrated in FIGURE 7 the core 10, the winding 11A, 11B and the rectifier 37 are held rigidly in a case 50 by an encapsulating mass of resin 51, the electrical connection to the external circuits being by means of terminals 52. The magnet 20 is embedded in a handle 53 and is provided with a pair of shaped pole pieces 54 that fit into correspondingly shaped recesses 55 in the remainder of the control device, the pole pieces contacting the core 10 when they are correctly in position so as to ensure good transfer of the magnet's flux to the core. Another construction is shown in FIGURE 8, parts similar to that in FIGURE 7 being given the same reference numeral. In this construction a single recess 55 is provided for insertion of the magnet 20, and the pole pieces 54 are provided on the core 10. The magnet 20 and its recess 55 may be of irregularly shaped cross section intended to restrict as far as possible the insertion therein of unauthorized not similarly shaped magnets.

A number of the latter control devices may be assembled together in a single casing 50, as illustrated by FIGURE 9, so as to form a pushbutton station, such as may be desired for an elevator or hoist control. If the devices are required to be mounted in a comparatively restricted space, or if the external circuits are of comparatively high sensitivity, then it may be preferred to arrange the devices as illustrated by FIGURE 10, wherein the cores of alternate devices are turned through a right angle to minimize the effect on each core of the respective permanent magnets when inserted to actuate a particular one of the immediately adjacent devices. If additional shielding is required then screens may be provided between each two adjacent devices, such screens being indicated in FIGURE 10 by the broken lines.

Although the control devices in accordance with the invention as described above take the form of a pushbutton, or its equivalent using a separable magnet control member, other forms of the control device are possible. For example, the pushbutton may be replaced by a rotary operator that produces the necessary combined displacement and rotary motion. Again a number of cores and associated windings can be mounted in a common casing to cooperate one at a time with a single magnet member, thus forming a selector switch. Simultaneous operation of two or more control devices can be obtained by arranging that the associated magnets are moved simultaneously by a common operating mechanism. The operating mechanism may be of the type providing remote operating and/or snap-acting facilities. The core and the magnet may be carried by two members that are movable relative to one another (such as suitable for use with a hoist or elevator), and so arranged that the control device functions as a proximity switch. By deliberate disposition of two core members side by side and so that in an intermediate position of the magnet both devices are in the closed circuit condition the facility can be provided that one control device is brought to closed circuit condition before the other device is brought to open circuit condition (make before break). In some embodimens the magnet may be fixed in position and coil unit movable, but generally this will not be as convenient as the embodiments using a movable magnet.

It will be understood that the invention has been disclosed with reference to specific embodiments thereof, and accordingly various modifications and changes may be made to the apparatus described within the scope of the invention.

We claim as our invention:

1. An inductive control device including a core of magnetic material, at least two coils disposed respectively on opposite limbs of the core with their axes at least approximately parallel, said coils being connected in series, a pair of signal sources connected in series and connected respectively to the said coils to supply operating current to each of said coils, a magnet member mounted for movement relative to the core between first and second positions, with said first position being closely adjacent to the core, so the magnet member increases the flux in one of said core limbs relative to the flux in the other limb, and with said second position being spaced from the core and with the magnetic axis of said magnet member being substantially perpendicular to the axis of at least one of said coils, and output terminals comprising the junction of the two signal sources and the junction of the two coils.

2. An inductive control device including a rectangular section closed core of magnetic material, a pair of similar coils respectively disposed on opposite limbs of the core and connected in series with one another, a pair of control windings connected in series with one another and connected respectively to the said coils to supply operating current thereto, a magnet member mounted for combined rotation and displacement relative to the core and between first and second positions in one of which positions the magnet member is closely adjacent to the core with its magnetic axis parallel to the coil axes so as to increase the flux in one of said coil bearing core limbs relative to the other limb, and in the other of which positions the magnet member is spaced from the core with its magnetic axis perpendicular to the coil axes, and output terminals comprising the junction of the pair of control windings and the junction of the two coils.

3. An inductive control device including a closed core of magnetic material, a pair of coils disposed respectively on opposite limbs of the core with the axes of said coils substantially parallel, said coils being connected in series with one another, a pair of signal sources connected in series and connected respectively to the said coils to supply operating current to each of said coils, an electromagnet member mounted adjacent the core, pole pieces operative with said electromagnet mounted for movement between two positions in one of which positions flux from the electromagnet is applied to the core to increase the flux in one of said coil bearing core limbs relative to that in the other core limb and in the other of which positions the flux is not so applied, and output terminals including a junction between the two signal sources and a junction between the two coils.

4. An inductive control device comprising a body of non-magnetic material, a closed core of magnetic material having a pair of limbs and being disposed within said body, a pair of coils disposed respectively on opposite limbs of the core and connected in series with one another, a magnet member, a pair of signal sources connected in series with one another and connected respectively to the said coils to supply operating current to each of said coils, a bore in said body for receiving said magnet member and so positioned relative to the core that said magnet when positioned within said bore increases the flux in one of said core limbs relative to that in the other of said core limbs, and output terminals including the junction of the two signal sources and the junction of the two coils.

References Cited in the file of this patent
UNITED STATES PATENTS

| | | |
|---|---|---|
| 2,457,165 | McNamee | Dec. 28, 1948 |
| 2,602,917 | Taylor | July 8, 1952 |
| 2,736,869 | Rex | Feb. 28, 1956 |
| 2,758,274 | Clark et al. | Aug. 7, 1956 |